June 20, 1950 — E. DONNELLEY — 2,512,267
BICYCLE CARRIER RACK
Filed April 2, 1947 — 3 Sheets-Sheet 1
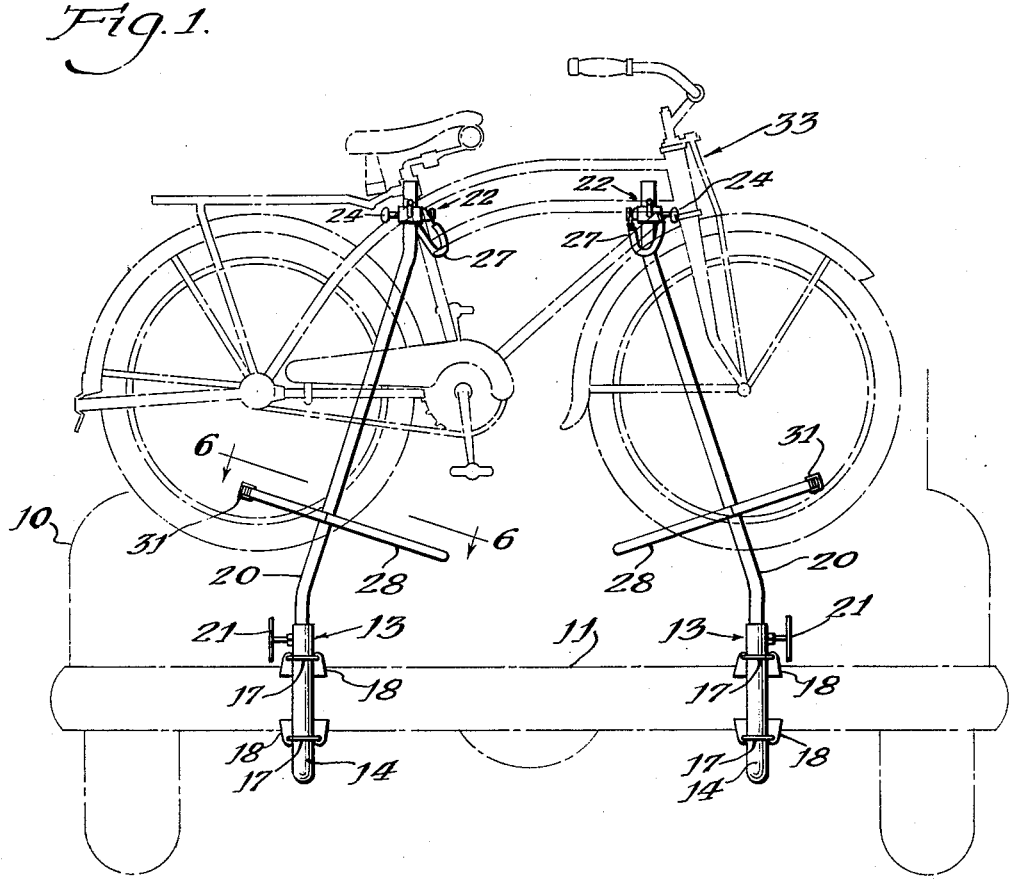
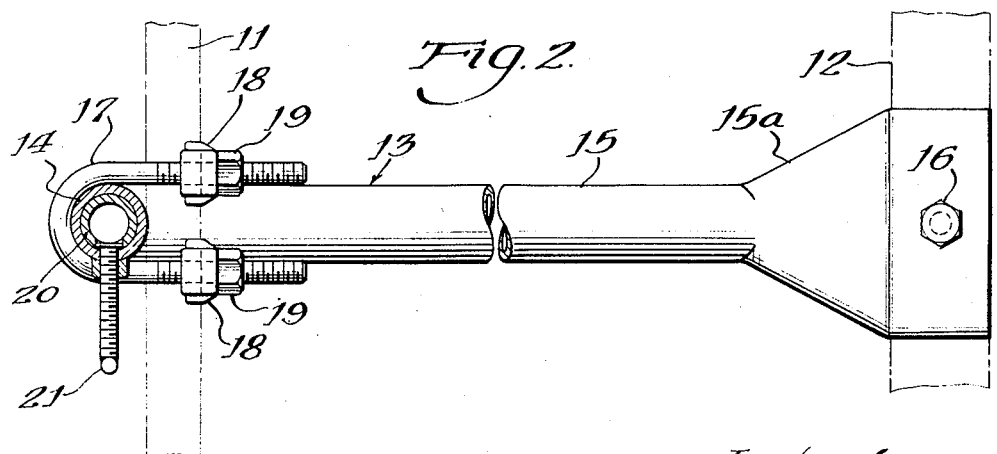
Inventor:
Elliott Donnelley
By Chitton, Schroeder, Merriam & Hofgren
Attorneys

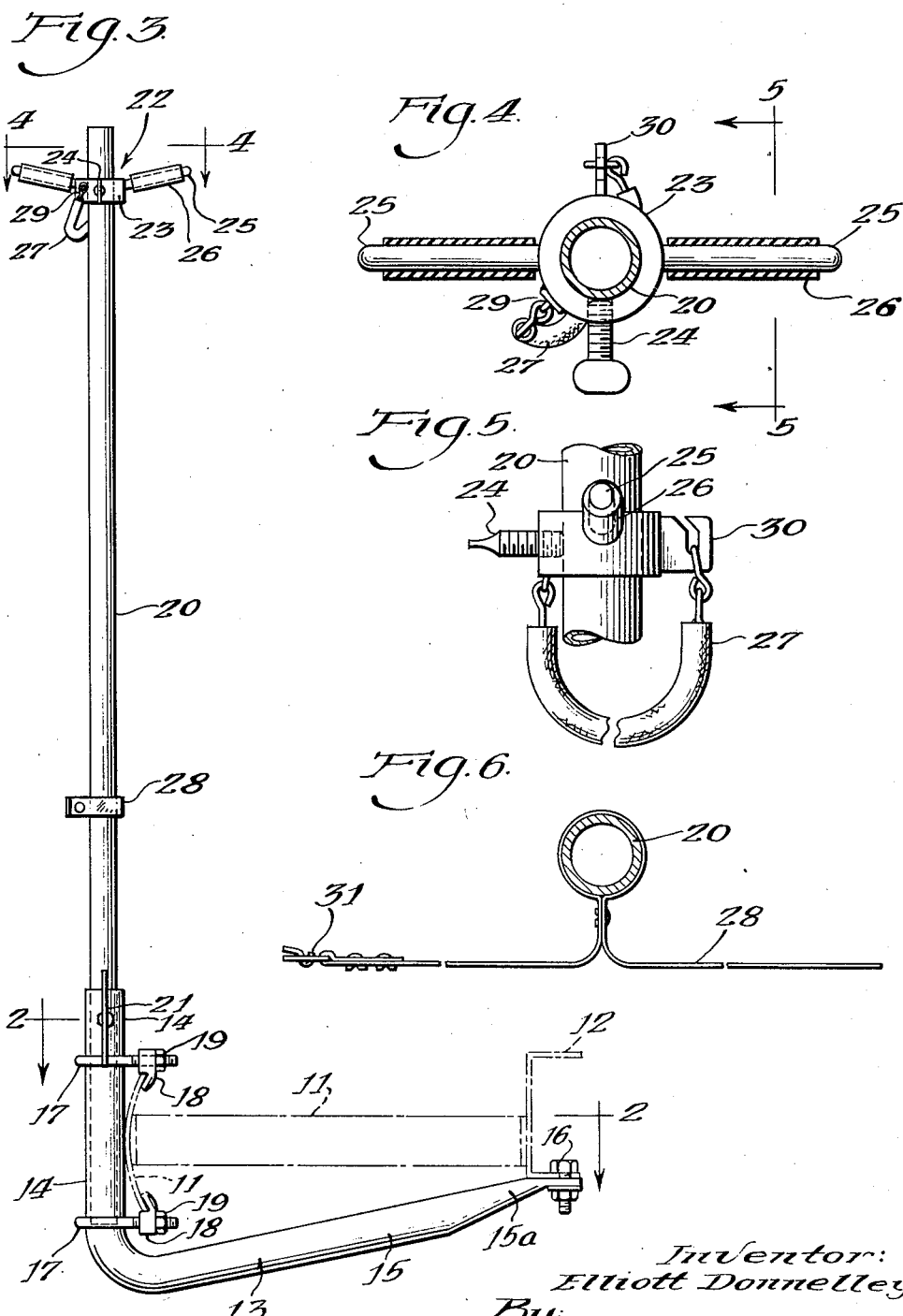

June 20, 1950 E. DONNELLEY 2,512,267
BICYCLE CARRIER RACK
Filed April 2, 1947 3 Sheets-Sheet 3
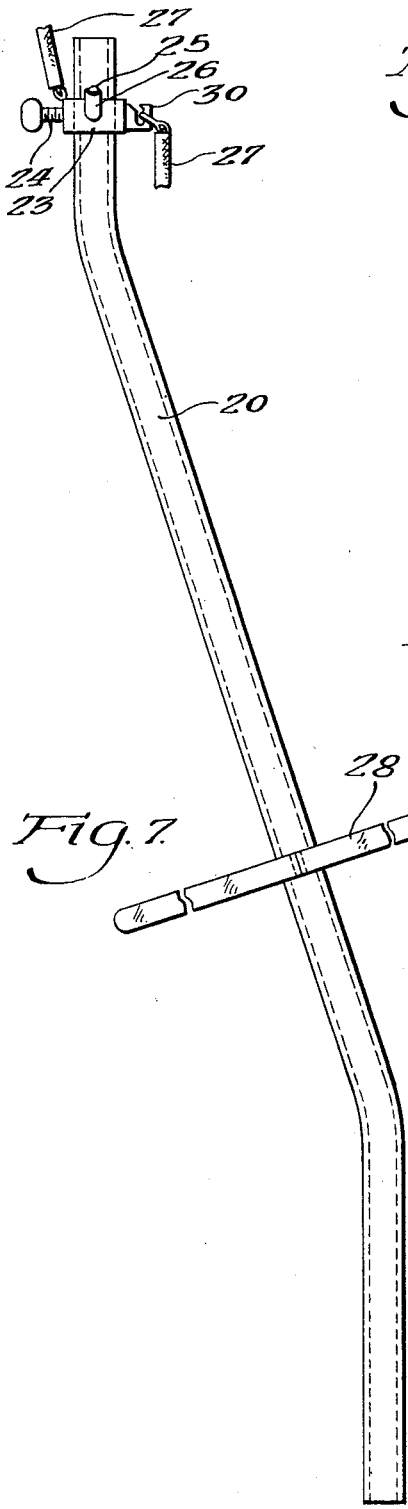
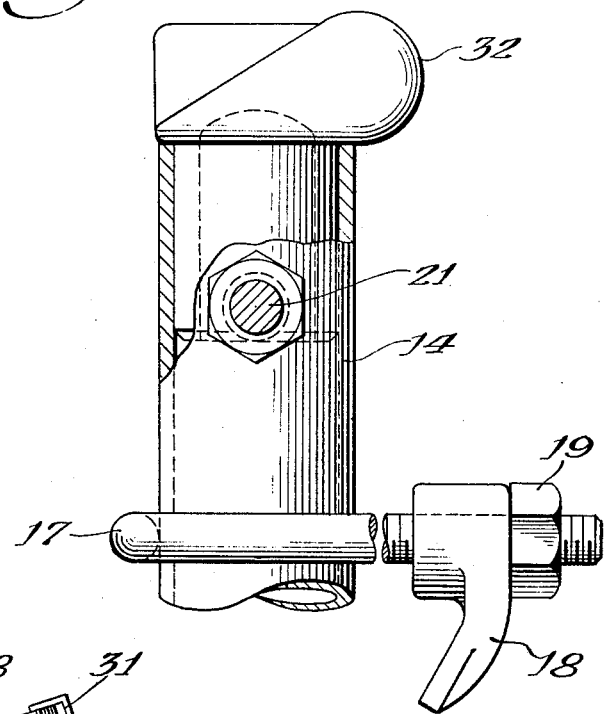
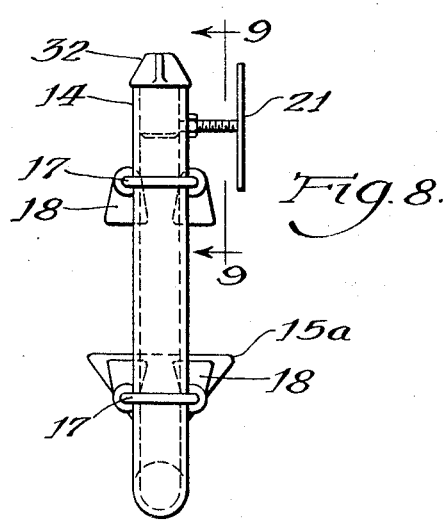
Inventor:
Elliott Donnelley
By:
Chritton, Schroeder, Merriam & Hofgren
Attorneys Patented June 20, 1950

2,512,267

UNITED STATES PATENT OFFICE 2,512,267

BICYCLE CARRIER RACK

Elliott Donnelley, Lake Forest, Ill., assignor to Barr-Don Inc.

Application April 2, 1947, Serial No. 738,805

9 Claims. (Cl. 224—42.03)

This invention relates to a bicycle carrier rack for attachment to an automobile.

The principal object of the invention is to provide an improved bicycle carrier rack for attachment to an automobile and, particularly, to provide such a rack which is neat in appearance, rugged, and composed of simple parts.

A further object is to provide such a rack which has base members which may be simply and permanently secured to an automobile, and bicycle carrier elements which are quickly detachable from the base members and may be stored in the automobile trunk when not in use.

A further object is to provide a rack in which the base members serve as bumper guards, and in which top plugs may be inserted in the base members to serve as dirt caps and to give the base members a finished appearance when the bicycle carrier elements are not in use.

A further object is to provide a rack which will accommodate any standard bicycle, and which requires no special fittings on the bicycle itself.

The invention is illustrated in a preferred embodiment in the accompanying drawings, in which:

Fig. 1 is a rear elevation of the bicycle rack in position on the rear of a car, with the car and a bicycle shown by dotted lines; Fig. 2 is a partial section taken as indicated at line 2—2 of Fig. 3; Fig. 3 is a side elevation of the device shown in Fig. 1; Fig. 4 is a section taken as indicated at line 4—4 of Fig. 3; Fig. 5 is a fragmentary section taken as indicated at line 5—5 of Fig. 4; Fig. 6 is a section taken as indicated at line 6—6 of Fig. 1; Fig. 7 is an elevation of a bicycle carrier element removed from the base member; Fig. 8 is a rear elevation of a base member with a top plug in place; and Fig. 9 is fragmentary section taken as indicated at line 9—9 of Fig. 8.

Referring to the drawings in greater detail, an automobile, indicated generally and in broken lines at 10, is provided with a standard rear bumper 11, and the drawings show a portion of a frame member 12. As best shown in Fig. 1, the rack consists of two similar assemblies of base member and bicycle carrier elements; but for convenience a single assembly will be described in detail, it being understood that there are pairs of each of the described parts. A base member, indicated generally at 13, preferably formed from tubular stock, is generally L-shaped, and is secured to the automobile with one arm 14 of the L in an upright position against the outer surface of the bumper 11, and the other arm 15 of the L serving as an extension which has a flattened end portion 15a, and which may be bolted to a frame member as at 16. The base member 13 is secured to the bumper 11 by means of a pair of U-bolts 17 which fit around the arm 14 and project beyond the edges of the bumper 11, each of the U-bolts being secured to the bumper by means of a pair of hook lug washers 18 which engage the upper and lower edges of the bumper and are held in place by nuts 19. The arm 14 of the base member 13 provides a socket in which a bicycle carrier element 20 may be detachably and telescopically supported, the element 20 being locked in place by means of a locking screw 21.

The bicycle carrier element 20 consists of an elongated tube which has a short lower portion which fits into the top of the base member 13, an intermediate portion which is approximately as long as the diameter of a bicycle wheel and which forms an obtuse angle with respect to the lower portion, and an upper portion which is parallel to the lower portion. When the element 20 is mounted in the base member 13, its intermediate portion forms an angle from the vertical substantially equal to the angle from the vertical of the front fork of a bicycle.

A bicycle hangar bar, indicated generally at 22, consists of a collar 23 which is slidably mounted on the upper portion of the carrier element 20, and is locked thereon by means of a lock screw 24, the collar 23 being provided with a pair of oppositely disposed hangar studs 25 which are directed slightly upwardly from their point of attachment to the collar. The hangar studs are preferably provided with rubber pads 26 so that a bicycle may be hung on them by its frame or handle bars without danger of scratching the finish.

The means for securing a bicycle to the rack preferably consists of an upper bicycle gripping lashing 27 and a lower bicycle gripping lashing 28. The upper lashing is preferably in the form of a padded chain which has one of its ends secured to an eye 29 on the collar 23, and the other end of which is adapted to engage a chain hook 30 which is secured to the opposite side of the collar 23. The lower lashing 28 is preferably a strap which is wrapped around the carrier element 20 and secured by a rivet, the strap having a conventional buckle 31 so that it may be used to secure a bicycle tightly to the carrier element. The hangar bar 22 may be adjusted on the upper portion of the carrier element 20 so as to adjust the spacing between the lashings 27 and 28 to accommodate bicycles of different sizes. The upper lashing 27 will ordinarily be fastened around the frame or the handle bars of a bicycle, and the lower lashing 28 will be secured to one of the wheels.

When the carrier element 20 is not in use, the upper end of the base member 13 is open to the dirt, and likewise presents an unfinished appearance. Accordingly, as seen in Figs. 8 and 9, a top plug 32 is provided which may be secured in the open upper end of the base member so as to serve as a dirt cap. The top plug 32 may be formed in any desired ornamental shape, as, for example, the airfoil shape shown in the drawings.

When the carrier rack is in use, the carrier elements 20 are telescopically mounted in the base members 13 and secured by tightening the lock screws 21. As best seen in Fig. 1, the elements 20 are mounted so that their intermediate portions are converging. A bicycle, indicated generally at 33, may be hung on the hanger bars 22 by resting the frame of the bicycle thereon, and the bicycle may then be made secure by means of the lashings 27 and 28. The rack will accommodate two bicycles, faced in opposite directions so that the handle bars do not interfere. In this event, one bicycle is rested upon the outer hanger studs, and the other bicycle is rested upon the inner hanger studs.

When the carrier elements 20 are not in use, they may be readily removed and stored in the trunk of the automobile, and the top plugs 32 may be secured in the base members 13 so as to keep dirt out of the base members and give them the desired finished appearance.

The foregoing detailed description is given for clearance of understanding only, and no unnecessary limitations should be understood therefrom, for some modifications will be obvious to those skilled in the art.

I claim:

1. A bicycle rack for attachment to an automobile, comprising: a pair of base members, each of said members being adapted to support an upwardly extending bicycle carrier element and having a forwardly extending arm adapted to be secured to a portion of the automobile frame; means for securing said base members to an automobile bumper; a pair of upwardly extending bicycle carrier elements detachably supported by said base members; and means for securing a bicycle to said carrier elements.

2. A bicycle rack for attachment to an automobile, comprising: a pair of base members, each of said members being adapted to support an upwardly extending bicycle carrier element; means for securing said base members to an automobile bumper; a pair of upwardly extending bicycle carrier elements detachably supported on said base members, each of said elements having a lower portion adapted to be secured to one of the base members, an intermediate portion at an obtuse angle to said lower portion and of a length substantially equal to the diameter of a bicycle wheel, and an upper portion substantially parallel to said lower portion; a bicycle hanger bar on each of said upper portions; an upper bicycle gripping lashing in operative relation to each of said hanger bars; and a lower bicycle gripping lashing adjacent the lower end of each of said intermediate portions.

3. A device of the character described in claim 2 wherein the hanger bars are adjustably secured to the upper portions of the bicycle carrier elements.

4. A device of the character described in claim 2 wherein the base members are tubular and form sockets in which the bicycle carrier elements are telescopically mounted.

5. A bicycle rack for attachment to an automobile, comprising: a pair of tubular base members, each of said members being substantially L-shaped, with one leg adapted to serve as a socket for an upwardly extending bicycle carrier element and the other leg adapted to be secured to a portion of the automobile frame; means for securing the first named leg of each of said base members to an automobile bumper; a pair of upwardly extending bicycle carrier elements telescopically supported in said base members, said elements being inclined toward one another through most of their length and the inclined portion of each element forming an angle with the vertical substantially equal to that of the front fork of a bicycle; a bicycle hanger bar adjustably secured adjacent the upper end of each of said elements; an upper bicycle gripping lashing in operative relation to each of said hanger bars; and a lower bicycle gripping lashing on each of said elements, said lower lashings being positioned to lash the wheels of a bicycle to the elements.

6. A bumper guard for automobiles, comprising: a substantially L-shaped member, one leg of said member being adapted to serve as a bumper guard and as a support for a detachable bicycle carrier element, and the other leg thereof being adapted to be secured to the frame of a car; means for securing said first named leg to the bumper of the car; and means for securing said second named leg to the frame of the car.

7. A device of the character described in claim 6 wherein the member is tubular and serves as a socket in which the bicycle carrier element may be telescopically mounted.

8. A device of the character described in claim 7 wherein a top plug is detachably secured in the socket to serve as a dirt cap.

9. A bicycle rack for attachment to an automobile comprising: a pair of base members, each of said members being adapted to support an upwardly extending bicycle carrier element; means for securing said base members to an automobile bumper; a pair of upwardly extending bicycle carrier elements detachably supported on said base members, each of said elements having a lower portion adapted to be secured to one of the base members, an intermediate portion at an obtuse angle to said lower portion and of a length substantially equal to the diameter of a bicycle wheel, and an upper portion substantially parallel to said lower portion; and means for securing a bicycle to said carrier elements.

ELLIOTT DONNELLEY.

REFERENCES CITED

The following references are of record in the file of this patent:

UNITED STATES PATENTS

| Number | Name | Date |
|---|---|---|
| 2,432,732 | Del Cano | Dec. 16, 1947 |

FOREIGN PATENTS

| Number | Country | Date |
|---|---|---|
| 572,068 | France | Feb. 14, 1924 |
| 93,243 | Sweden | Nov. 11, 1938 |
| 93,810 | Sweden | Dec. 14, 1938 |
| 96,775 | Sweden | Sept. 5, 1939 |